United States Patent [19]
Curtis

[11] 4,438,945
[45] Mar. 27, 1984

[54] ASSEMBLY FOR MOUNTING A WORK OBJECT ON A VEHICLE OR THE LIKE

[75] Inventor: Stanley F. Curtis, Exeter, Calif.

[73] Assignee: Pollution Controls Industries, Inc., Tulare, Calif.

[21] Appl. No.: 343,224

[22] Filed: Jan. 27, 1982

[51] Int. Cl.³ .............................................. B60D 1/00
[52] U.S. Cl. ................................. 280/501; 280/491 E; 280/495
[58] Field of Search ............... 280/491 A, 491 E, 495, 280/501, 504

[56] References Cited
U.S. PATENT DOCUMENTS 2,097,006 10/1937 Weis ..................................... 280/501
3,281,164 10/1966 Reaser ................................. 280/501
3,768,837 10/1973 Reese ................................... 280/495

Primary Examiner—Joseph F. Peters, Jr.
Assistant Examiner—Donn McGiehan
Attorney, Agent, or Firm—Huebner & Worrel

[57] ABSTRACT

An assembly for mounting a work object on a vehicle or the like in a predetermined position relative to a pair of members borne by the vehicle, the assembly having a first component mountable on one of the members adjacent to the predetermined position and a second component having a work object mount and adapted for releasable attachment to the first component and for slidable attachment to the other of the members to support the work object mount in the predetermined position.

4 Claims, 4 Drawing Figures

ASSEMBLY FOR MOUNTING A WORK OBJECT ON A VEHICLE OR THE LIKE

BACKGROUND OF THE INVENTION

1. Field of the Invention

The present invention relates to an assembly for mounting a work object on a vehicle or the like and more particularly to such an assembly which is particularly well suited to mounting a work object in supported relation on a pair of spaced structural members of a vehicle in such a manner as to permit ready installation and removal of the assembly relative to the precise position desired for mounting of the work object.

2. Description of the Prior Art

It is frequently necessary to mount attachments of a variety of types, such as trailer hitches, tow bars, and the like, on vehicles in such a manner that they can easily by installed and removed. The mounts for such attachments are often bulky themselves. In order to provide the strength required for supporting the attachments, the mounts therefor are usually more or less permanently attached to the vehicle. For example, in many instances such mounts are welded on the vehicle or bolted on the vehicle in such a manner that removal is impractical. Conversely, when such mounts are not in use, their size is such as to interfere with normal use of the vehicle. In any case, when such mounts are removed, reinstallation is both tedious and requires the services of personnel familiar with their installation.

This problem is particularly pronounced in the military where a premium is placed on mobility and the rapid deployment of military vehicles. The time required for the installation and removal of such mounts and their attachments must be minimized to an extent not heretofore possible. Furthermore, owing to the speed with which such operations must be performed, such equipment must be capable of installation without the possibility of error if it is to be of practical value.

Therefore, it has long been known that it would be desirable to have an assembly for mounting a work object on a vehicle or the like which in use operates to support the attachment in the precise position desired and in such a manner as to be fully structurally sound and yet which can easily be installed and removed without any substantial instruction or effort.

SUMMARY OF THE INVENTION

Therefore, it is an object of the present invention to provide an improved assembly for mounting a work object on a vehicle or the like.

Another object is to provide such an assembly which can be employed to attach a wide variety of work objects on vehicles including coupling devices, trailer hitches, tow bars and the like.

Another object is to provide such an assembly which is particularly well suited for mounting the coupling device of U.S. Pat. No. 4,214,771 on a vehicle.

Another object is to provide such an assembly which is uniquely adapted to mount a work object on a jeep or other military vehicle.

Another object is to provide such an assembly which permits a substantial portion thereof to be removed from the vehicle when the work object is not in use and yet which can be rapidly installed on a vehicle when the work object is to be used without substantial effort or instruction while mounting the assembly in the precise position desired and with all of the strength necessary for support of the work object in that position.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
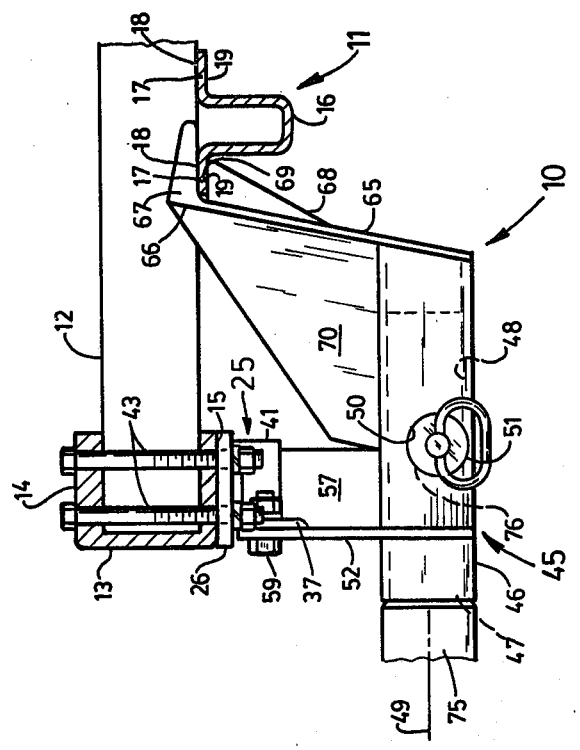
FIG. 1 is a fragmentary longitudinal section of a vehicle showing the assembly of the present invention mounted thereon in a typical operative position.

Referring more particularly to the drawings, the assembly of the present invention is generally indicated by the numeral 10 in FIG. 1. As shown therein a vehicle, in this case, a jeep, is generally indicated by the numeral 11. The vehicle has a frame 12 mounting a first transverse member or bumper 13 extending transversely of the longitudinal axis of the vehicle. The bumper has an upper surface 14 and an opposite lower surface 15. The frame has a second transverse member 16 mounted transversely therein in spaced, substantially parallel relation to the bumper 13, as best shown in FIG. 1. The second transverse member has laterally extending flanges 17 defining a substantially common, horizontal plane and one of which extends in the direction of the bumper 13. The lateral flanges 17 have upper surfaces 18 and lower surfaces 19.

The structure of the frame 12 described above is characteristic of all jeep vehicles. It will be understood that these same structural elements are present in other vehicles or can be installed on other types of vehicles to permit mounting of the assembly 10 thereon. Of course, the specific configuration of the assembly can also be varied to adapt it to other vehicles.

Figure 2:
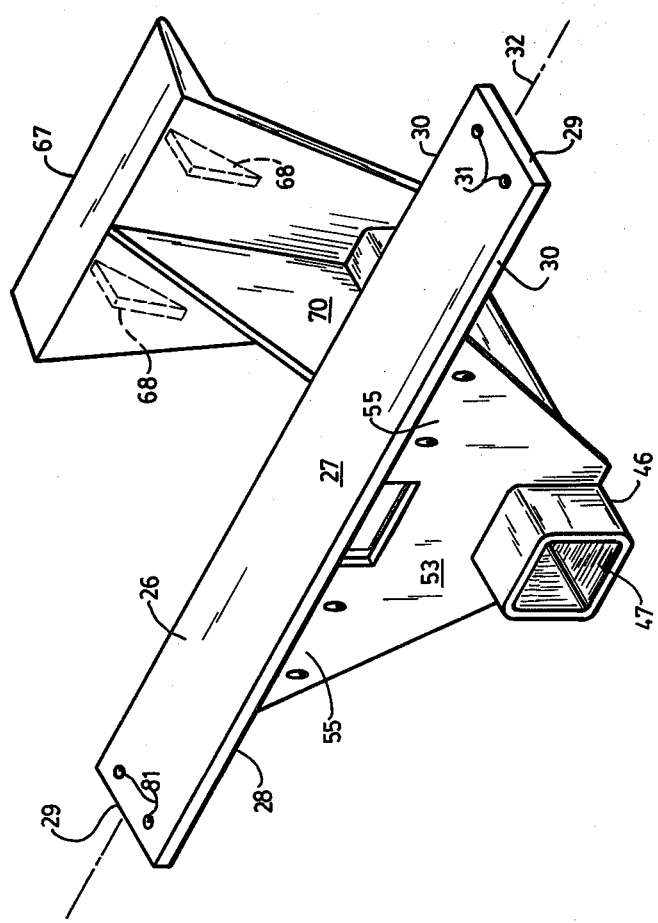
FIG. 2 is a perspective view of the assembly.

The assembly 10 has a first element or component 25 including a flat plate 26, preferably of a rectangular configuration, having an upper surface 27 and an opposite lower surface 28. The plate has opposite end portions 29 and lateral edges 30. A pair of bolt holes 31 are extended through each of the opposite end portions 29 of the plate in spaced relation to each other, as best shown in FIG. 2. For purposes of illustrative convenience, it will be understood that the plate 26 has a longitudinal axis 32.

The first component 25 includes a pair of mounting plates 37 secured, as by welding, on the lower surface 28 of the plate in spaced relation to each other and preferably in a common plane substantially right-angularly related to the lower surface 28 of the plate and parallel to the longitudinal axis 32 thereof. The mounting plates have front surfaces 38 and back surfaces 39. Each of the mounting plates 37 has a pair of bolt holes 40 extending therethrough in a predetermined pattern. A noncircular or rectangular sleeve 41 is mounted, as by welding, on the lower surface 28 of the plate 26 in a predetermined position substantially centrally thereof. The sleeve has a longitudinal axis 42 which is right-angularly related to the longitudinal axis 32 of the plate. When installed on the vehicle 11 as shown in FIG. 1, a pair of bolt and nut assemblies 43 are individually extended through each pair of bolt holes 31 of the plate and through the bumper 13 to mount the plate with its longitudinal axis 32 parallel to the longitudinal axis of the bumper and with the mounting plates 37 and rectangular sleeve 40 extending downwardly in a direction away from the bumper.

The assembly 10 has a second element or component 45. The second component includes a mounting tube 46 which is generally rectangular in cross section and has an entrance 47 communicating with the longitudinal passage 48 extending along the longitudinal axis 49 of the tube. The longitudinal passage is dimensioned slidably to receive the work object adapted to be mounted on the assembly 10. A pair of holes 50 are provided in the tube defining a common axis extending transversely through the tube in right angular relation to the longitudinal axis 49 of the tube. A locking pin 51 is adapted for removable receipt in the holes 50 so as to lock the particular work object within the tube by extension through a corresponding hole provided in the work object.

A mounting plate 52 is secured by welding on the mounting tube 46 adjacent to the entrance 47 thereof and defining a plane substantially right-angularly related to the longitudinal axis 49 of the longitudinal passage 48. The mounting plate has a front surface 53 and a back surface 54. The mounting plate has extended portions 55 spaced from each other and through which a pair of bolt holes 56 are individually extended in patterns matching those of the pair of bolt holes 40 of the first component 25. A noncircular or rectangular sleeve 57 is mounted, as by welding, on the mounting tube 46 in upstanding relation and having a longitudinal axis 58 right-angularly related to the longitudinal axis 49 of the longitudinal passage 48. The rectangular sleeve 57 is dimensioned for slidable receipt in the rectangular sleeve 41 of the first component, as best shown in FIG. 1, when the back surfaces 54 of the mounting plate 52 are placed in facing engagement with the front surfaces 38 of the mounting plates 37 of the first component 25. In this position, bolt and nut assemblies 59 are individually extended through the corresponding bolt holes 40 and 56 of the respective mounting plates 52 and 37 and tightened into their respective positions as shown in FIG. 1 releasably to mount the second component on the first component.

Figure 3:
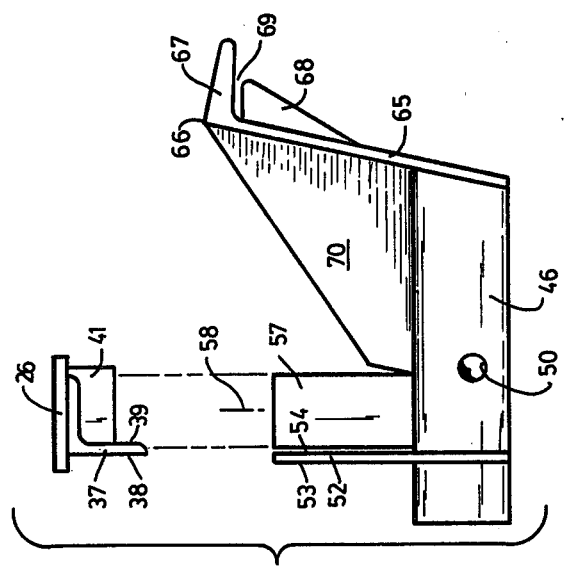
FIG. 3 is a side elevation of the assembly with the first and second components thereof disposed in spaced relation.
Figure 4:
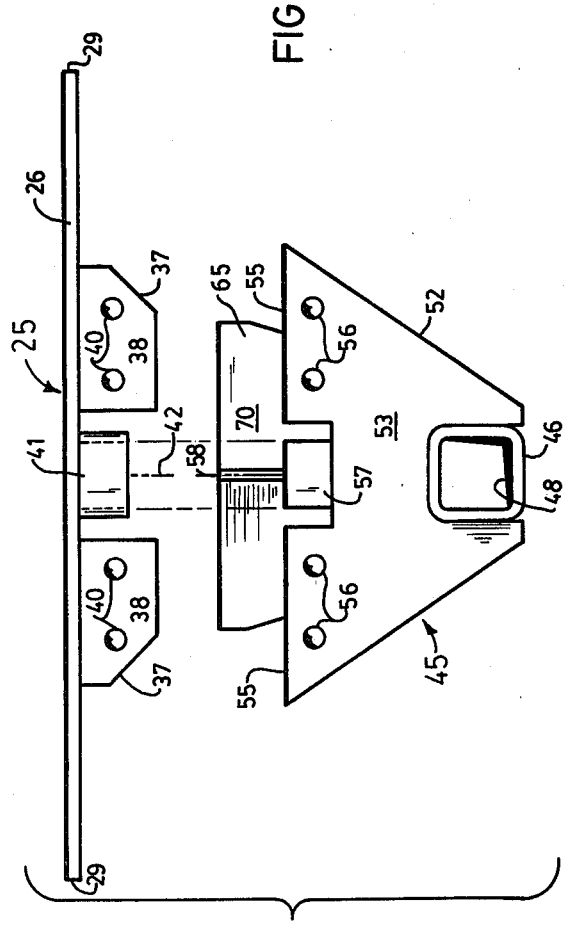
FIG. 4 is a front elevation of the assembly with the first and second components thereof disposed in spaced relation.

The second component 45 has a support plate 65 mounted by welding on the end of the mounting tube 46 remote from the entrance 47 thereof and extending in diverging relation with respect to the mounting plate 52 thereof to a distal end portion 66. A flange 67 is mounted on the distal end portion 66 of the support plate in nearly right angular relation thereto as shown in FIG. 3 and extends in a direction away from the rectangular sleeve 57. A pair of gusset plates 68 are mounted in spaced relation on the support plate 65 spaced from the flange 67 thereof to form a slot 69 adapted slidably to receive the lateral flange 17 of the transverse member 16, as best shown in FIG. 1. A brace plate 70 is secured by welding on the mounting tube and the support plate 65 in reinforcing relation to the support plate.

For illustrative convenience, a work object 75 is fragmentarily shown in FIG. 1 received in the mounting tube 46 of the second component 45 in mounted relation. The work object has a locking pin hole 46 extending transversely therethrough dimensioned to receive the locking pin 51 extending through the holes 50 of the mounting tube and the hole 76 of the work object firmly to secure the work object in position in the mounting tube. It will be understood, however, that a variety of types of work objects can be received in the mounting tube and the shape, length and size of the tube can be varied to receive the specific work object desired.

OPERATION

The operation of the described embodiment of the subject invention is believed to be readily apparent and is briefly summarized at this point. The first component 25 is mounted on the bumper 13 of the frame 12 of the vehicle 11 as already described and as best shown in FIG. 1. When so mounted in position, the vehicle is freely available for use in the normal manner without the assembly 10 of the present invention in any way interfering with such normal use of the vehicle. In fact, the first component is hardly visible and is of no appreciable weight relative to the vehicle so as in any way to interfere with such operation.

When it is desired to mount a work object, such as work object 75, on the vehicle, the second component 45 is mounted in its operative position shown in FIG. 1. Such installation is achieved by grasping the second component and sliding the flange 67 and gusset plates 68 about the forwardly extending lateral flange 17 of the second transverse member 16 so that the lateral flange 17 is received in the slot 69. During such movement onto the flange 17, the rectangular sleeve 57 is aligned with and slowly inserted into the rectangular sleeve 41 of the first component and the extended portions 55 of the mounting plate 52 slipped in front of the pair of mounting plates 37 of the first element. When the fully installed position shown in FIG. 1 is reached, the bolt and nut assemblies 59 are extended through the bolt holes 56 of the extended portion 55 and the bolt holes 40 of the mounting plates 37 and tightened into position. This secures the second component in the position shown in FIG. 1 securely supported on the first and second transverse members 13 and 16 respectively of the frame 12 with the longitudinal axis 49 of the longitudinal passage 48 of the mounting tube 46 aligned with the longitudinal axis of the vehicle 11.

The work object 75 is then inserted into the longitudinal passage 48 of the mounting tube 46 and the locking pin 51 inserted through the holes 50 of the mounting tube 48 and hole 76 of the work object. This securely mounts the work object in operative position on the vehicle. The work object is then employed in the normal manner in relation to the vehicle.

When the work object has been employed for the purpose desired, its removal from the vehicle is achieved by a reversal of the steps heretofore described. Thus, the locking pin 51 is removed from the hole 76 and holes 50 and the work object slidably removed from the longitudinal passage 48 of the mounting tube 46. Similarly, the bolt and nut assemblies 59 are removed from the extended portions 55 of the mounting plate 52 and from the mounting plates 37 of the first component 25. Thereafter, the operator simply simultaneously slides the second component downwardly from the first component and the flange 67 and gusset plate 68 of the support plate 65 from about the lateral flange 17 of the second transverse beam 16. Upon such removal, the vehicle is again available for use without the assembly 10 in any way interferring with normal operation of the vehicle.

It will be seen, that the second component 45 can be installed and removed with virtually no instruction or training securely to mount a work object on a vehicle in the precise position required. It is virtually impossible for the second component to be mounted incorrectly or in such a manner as would prove hazardous to the operator.

Therefore, the assembly for mounting a work object on a vehicle or the like of the present invention permits the installation of a work object in the precise position desired on a vehicle in securely mounted relation with little or no instruction both rapidly and conveniently and in such a manner as virtually to preclude the possibility of improper installation while simultaneously being rapidly removable from the vehicle so as to leave the vehicle free for normal use when use of the work object is not required.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An assembly for mounting a work object on a vehicle having a frame with a pair of transversely extending structural members disposed in spaced, substantially parallel relation to each other and in substantially right-angular relation to a longitudinal axis of the vehicle, the assembly comprising a first component adapted to be mounted in an assembled position on one of said structural members and having a mounting plate and projection extending therefrom substantially in a common direction relative to the first component; and a second component having a mount for said work object, a mounting plate and projection extending therefrom substantially in a common direction relative to the second component and a support engageable with the other of said structural members in depending relation in an assembled position with said first component wherein the plates and projections of the first and second components can be interlocked with each other to secure the mount for said work object on the vehicle in substantial alignment with said longitudinal axis of the vehicle, and wherein said projections of the first and second components have tubular configurations dimensioned for fitted engagement with each other along an axis substantially normal to the longitudinal axis of the vehicle when the first and second components are in the assembled positions to resist lateral movement of the second component relative to the first component.

2. The assembly of claim 1 wherein said projections are noncircular in cross section to resist movement about said axis of fitted engagement.

3. The assembly of claim 1 in which the second of said structural members has a flange extending toward the first of said structural members and wherein the support of the second component has a plate substantially normal to said axis of fitted engagement for rested engagement on the flange of the second of said structural members in said assembled position.

4. An assembly for mounting a coupling device or the like on a vehicle having a frame with a transverse bumper and a structural member spaced from the bumper in substantially parallel relation thereto and having a flange extending therefrom in the direction of the bumper, the assembly comprising:
A. a first component having:
 1. a substantially flat main plate with a longitudinal axis,
 2. a pair of mounting plates secured on the main plate in spaced relation to each other substantially in a common plane substantially right-angularly related to the main plate in substantial alignment with the longitudinal axis of the main plate, and
 3. a noncircular sleeve mounted on the main plate defining a longitudinal axis substantially right-angularly related to the main plate;
B. a second component having:
 1. a coupling device mounting tube having a longitudinal axis,
 2. a mounting plate secured on the mounting tube in substantially right angular relation to the longitudinal axis of the tube,
 3. a noncircular sleeve mounted on the mounting tube defining a longitudinal axis substantially right-angularly related to the mounting tube, and
 4. a support plate secured on the mounted tube in spaced relation to the mounting plate and noncircular sleeve thereof and extending from the mounting tube to a distal end portion having a slot dimensioned for fitted engagement with said flange of the structural member;
C. means for mounting the main plate of the first component on the underside of the bumper with the longitudinal axis of the main plate in substantial alignment with the bumper and the mounting plates and noncircular sleeve thereof extending downwardly from the bumper; and
D. means for releasably mounting the second component on the first component with the mounting plate of the second component secured in substantially facing engagement with the mounting plates of the first component, the noncircular sleeve of the second component slidably received in the noncircular sleeve of the first component and the flange of the structural member received in said slot of the support plate of the second component to mount said mounting tube on the vehicle with the longitudinal axis thereof disposed in substantially right angular relation to the bumper.

* * * * *

UNITED STATES PATENT AND TRADEMARK OFFICE
CERTIFICATE OF CORRECTION

PATENT NO. : 4,438,945
DATED : March 27, 1984
INVENTOR(S) : Stanley F. Curtis

It is certified that error appears in the above-identified patent and that said Letters Patent are hereby corrected as shown below:

Column 4, line 50, delete "48" and substitute ---46---.

Signed and Sealed this

Fourth Day of September 1984

[SEAL]

Attest:

GERALD J. MOSSINGHOFF

Attesting Officer

Commissioner of Patents and Trademarks